United States Patent [19]

Murakami et al.

[11] Patent Number: 4,802,688

[45] Date of Patent: Feb. 7, 1989

[54] DOUBLE LINK TYPE SUSPENSION SYSTEM

[75] Inventors: Takuya Murakami, Atsugi; Toshihiko Kamimoto, Isehara, both of Japan

[73] Assignee: Nissan Motor Co., Ltd., Japan

[21] Appl. No.: 89,447

[22] Filed: Aug. 26, 1987

[30] Foreign Application Priority Data

Aug. 28, 1986 [JP] Japan .................................. 61-202256

[51] Int. Cl.⁴ .............................................. B62D 7/06
[52] U.S. Cl. ..................... 280/666; 280/668; 280/670; 280/673
[58] Field of Search ............... 280/666, 668, 670, 673, 280/674, 696, 701, 724

[56] References Cited

U.S. PATENT DOCUMENTS 4,570,969 2/1986 Tsutsumi et al. .................... 280/664

FOREIGN PATENT DOCUMENTS 5996007 8/1987 Japan .
60135314 8/1987 Japan .

1151987 5/1969 United Kingdom ................ 280/673

*Primary Examiner*—Kenneth R. Rice
*Attorney, Agent, or Firm*—Leydig, Voit & Mayer

[57] ABSTRACT

A double link type suspension system for use, for example, in an automotive vehicle of the front engine front drive type or the four wheel drive type is comprised of a knuckle for rotatably supporting a wheel of the vehicle. Upper and lower control arms are swingably connected at their inboard end section with a vehicle body. The outboard end section of the lower control arm is connected through a first joint to a lower section of the knuckle. Additionally, an extension member is provided to connect both the outboard end sections of the upper and lower control arms. The extension member is also movably connected through a second joint to the upper part of the knuckle, in which an imaginary axis connecting the first and second joints serves as a steering axis around which the wheel is turnable to steer the vehicle, thereby increasing freedom of selection of location of the outboard end section of the upper control arm.

20 Claims, 3 Drawing Sheets

DOUBLE LINK TYPE SUSPENSION SYSTEM

BACKGROUND OF THE INVENTION

1. Field of the Invention

The present invention relates generally to a double link type suspension system, for example, in use for an automotive vehicle, and more particularly to a double wish-bone type suspension system having upper and lower control arms and a shock absorber whose one end is attached to the side of a vehicle body and whose other end is connected directly or through the lower control arm to a steering knuckle.

2. Description of the Prior Art

In connection with automotive vehicles, a variety of double link type suspension systems have been proposed and put into practical use as disclosed, for example, in Japanese Patent Provisional Publication No. 59-96007 (referred hereinafter to as "the first prior art") and in Japanese Patent Provisional Pubrication No. 60-135314 (referred hereinafter to as "the second prior art"). In a suspension system of the first prior art, an upper section of a knuckle is upwardly extended over a wheel to form an upper end thereof, in which the upper end is connected through an upper control arm to a vehicle body. In a suspension system of the second prior art, an upper control arm is long as compared with as usual, and a steering axis (kingpin axis) is set regardless of the upper control arm. Now in order to obtain a suitable suspension geometry, the upper control arm of the double link type suspension system is required to ensure a considerable length and therefore cannot be so shortened.

The above-summarized prior art will be discussed hereinafter. In the case of the first prior art suspension system, the inboard end of the upper control arm is supported by a vehicle body while the outboard end of the same is connected to the upper end of the knuckle, and additionally the upper control arm cannot be shortened for the above-mentioned reason, thereby allowing a wheel house to extend to the side of an engine compartment in accordance with the length of the upper arm. In addition, a shock absorber is disposed generally parallel with the upwardly extended knuckle upper section. Thus, the width of the wheel house is enlarged thereby to unavoidably minimize the width of the engine compartment. Particularly in this first prior art suspension system, since the knuckle which is disposed parallel with the shock absorber is turned together with the wheel during steering, a sufficiently wide space is necessary between them in order to prevent interference therebetween during turning of the vehicle. This particularly enlarges the width of the wheel house. Furthermore, the turning of the knuckle together with the wheel requires a ball joint large in height for connection between the upper end of the knuckle and the upper control arm, so that the height of the wheel house is unavoidably enlarged.

In the case of the second prior art suspension system, the distance between the upper and lower control arms is relatively small, variation of camber angle and caster angle due to assembly error of suspension system component parts ends up being relatively large. Additionally, such camber angle and caster angle change greatly depending upon the vertical swing of the upper and lower control arms. Therefore, the vehicle steering is not sufficiently controllable.

SUMMARY OF THE INVENTION

An object of the present invention is to provide an improved double link type suspension system for a vehicle, adapted to increase freedom of selection of the location of the outboard end section of an upper control arm by separating elements for setting a steering axis and elements for setting camber angle, thereby minimizing the width and height of a wheel house as much as possible to enlarge the width of an engine compartment located thereinside while setting wheel alignment appropriately.

Another object of the present invention is to provide an improved double link type suspension system for a vehicle, in which the rigidity of upper and lower control arms in particular is raised thereby simplifying a kingpin axis structure having a steering axis, around which a wheel is turnable to steer the vehicle.

Therefore, the double link type suspension system of the present invention is composed of a knuckle for rotatably supporting a wheel of a vehicle. Upper and lower control arms are swingably connected at their inbord end sections with a vehicle body. The outboard end section of the lower control arm is connected through a first joint to a lower section of the knuckle. Additionally, an extension member is provided to connect both the outboard end sections of the upper and lower control arms. The extension member is also movably connected through a second joint to the upper section of the knuckle. An axis connecting the first and second joints serves as a steering axis around which the wheel is turnable to steer the vehicle.

Accordingly, fore-and-aft forces such as driving force and bracking force and lateral forces are all exerted on the wheel are supported by a suspension link structure constructed of the upper and lower control arms and the extension member. In this suspension link structure, the upper control arm is located at a higher position, and additionally the distance between the upper and lower control arm is considerably increased, so that the suspension link structure has high rigidity. The rigidity of the suspension link structure is further increased by the fact that the outboard end sections of the upper and lower control arms are connected by the extension member.

When the knuckle is operated to steer the vehicle, the knuckle, the axle shaft and the wheel are turned around the steering axis. At this time, only a moment around the steering axis or kingpin axis acts on the kingpin axis structure since other moments are allotted to the extension member. A light load is applied to the kingpin axis structure, and therefore the kingpin axis structure is allowed to be small-sized and light in weight, thereby simplifying the structure thereof.

BRIEF DESCRIPTION OF THE DRAWINGS

In the drawings, like reference numerals designate like elements and parts throughout drawings, in which.

DETAILED DESCRIPTION OF THE INVENTION

Figure 1:
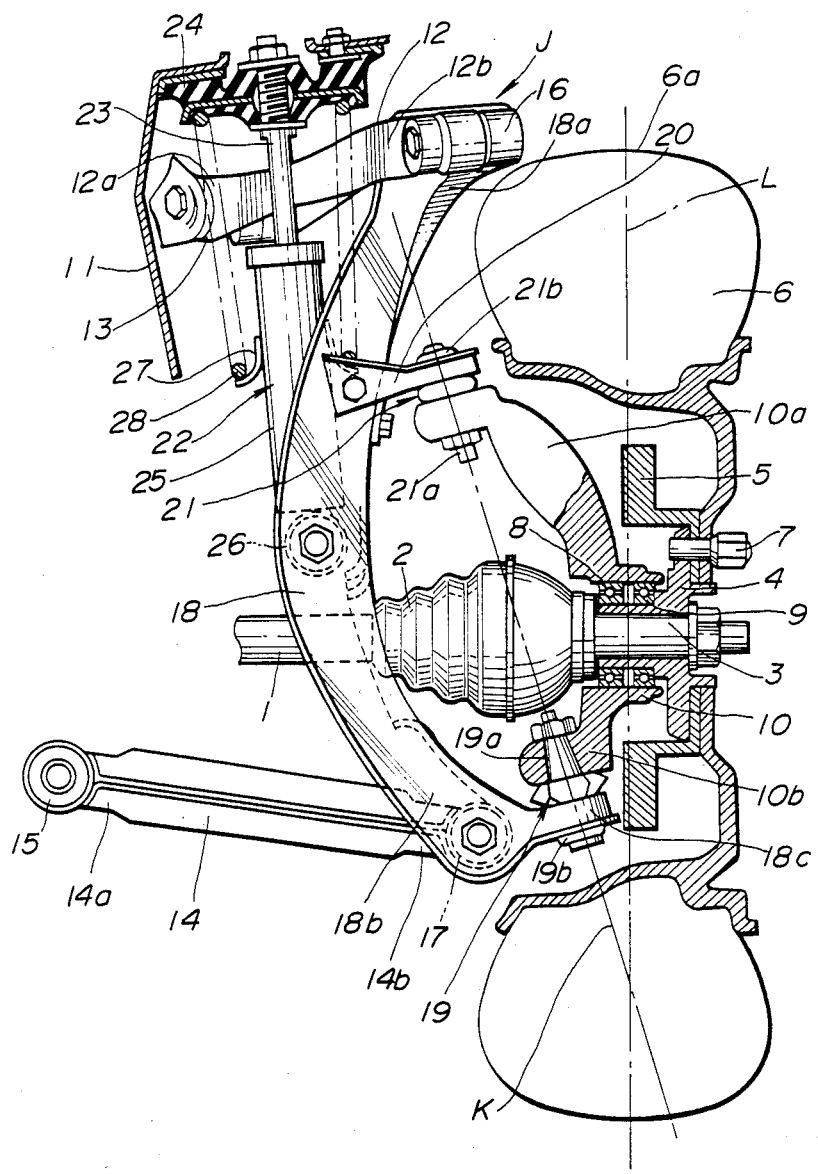
FIG. 1 is a front elevation, partly in section, of a first embodiment of a double link type suspension system in accordance with the present invention.

Referring now to FIG. 1, there is shown a first embodiment of a double link type suspension system in accordance with the present invention. The suspension system of this embodiment is a front suspension system of the double wish-bone type and is used for an automotive vehicle of the front engine front drive (FF) type or the four wheel drive type (4WD) type wherein driving force from an engine (not shown) is transmitted to front wheels (only one wheel is shown) 6. The suspension system is comprised of a steering knuckle 12 rotatably mounted through bearings 8, 9 on a hub 4 which is in turn fixedly mounted on an axle shaft 3 in such a manner as to be rotatable together with the axle shaft 3. The axle shaft 3 is supplied with the driving force from the engine through a transmission and a final speed-reduction device which is not shown. A brake disc 5 and the wheel 6 are fixedly secured to the hub 4 to be rotatable together with hub 4 as a one-piece member.

An upper control arm 12 is disposed inside a wheel house (not identified) and has an inboard end section 12a which is movably connected through a rubber insulation bushing 13 to a portion of the vehicle body 11 which portion is located near the level of the uppermost section 6a of the wheel 6, so that the upper control arm 12 is swingable relative to the vehicle body 11. The upper control arm 12 extends laterally outwardly relative to the vehicle body 11 and has an outboard end section 12b located near the upper-most section 6a of the wheel 6. A lower control arm 14 is disposed to laterally extend relative to the vehicle body 11 and has an inboard end section 4a movably connected through a rubber insulation bushing 15 to the vehicle body, so that the lower control arm 14 is swingable relative to the vehicle body 13.

An extension bracket or member 18 extends generally vertically and has an upper end section 18a which is movably connected through a rubber bushing 16 to the upper control arm 12 at the outboard end section 12b. The outboard end section 14b of the lower control arm 14 is movably connected through a rubber bushing 17 to the lower end section 18b of the extension bracket 18. The extension bracket 18 is curved inwardly so as to have generally the shape of a C so that the upper end section 18a comes to a position over the peripheral surface of the wheel (tire) 6. Accordingly, a joint between the extension bracket upper end section 18a and the upper control arm outboard end section 12b is located outward relative to the vehicle body 11 in such a manner that a part of the joint is positioned over the peripheral surface of the wheel 6. The extension bracket 18 is integrally formed at its lower end section 18b with an outward extending projection 18c which is pivotally connected through a ball joint 19 with the tip end portion of the lower section 10b of the knuckle 10. More specifically, the ball joint 19 includes a ball stud 19a secured to the tip end portion of the knuckle lower section 10b. The ball stud 19a is rotatably received by a retainer 19b of the ball joint which retainer is secured to the extension bracket projection 18c.

The inner end of a support bracket 20 is bolted to the extension bracket 18 at a position between the central and the upper end section 18a. The support bracket 20 extends outward or toward the wheel 6 and is pivotally connected at its outer end section with the tip end portion of the knuckle upper section 10a through a ball joint 21. More specifically, the ball joint 20 includes a ball stud 21a secured to the tip end portion of the knuckle upper section 10a. The ball stud 21a is rotatably supported by a retainer 21b secured to the outer end section of the support bracket 20. As shown, the axes of the ball studs 19a, 21a of the ball joints 19, 21 are aligned with each other to form a steering axis or kingpin axis K around which the wheel 6 is turnable. In this connection, the joint J between the upper control arm outboard end section 12b and the extension bracket upper end section 18a is spaced from the extension of the steering axis K. Thus, it is unnecessary that the above-mentioned joint including the rubber insulation bushing 16 be positioned such that the extension of the steering axis K passes through the joint. Therefore, the position of the joint J may be suitably selected regardless of the length of the upper control arm 12, the position of the steering axis K and the like. As shown, in this embodiment, a center line L of the wheel 6 (in the direction of width of the wheel in a cross-section including the axis of rotation of the wheel) crosses the steering axis 36 at a position above a plane (not shown) at which the wheel (tire) 6 is in contact with the ground or road surface. The steering axis 36 intersects the above-mentioned plane at a position lying outward of the wheel center line L thereby setting a so-called negative scrub radius. The outer tube 25 of the shock absorber 22 is movably secured through a rubber insulation bushing 26 to the central section of the extension bracket 18. Additionally, a coil spring 28 is disposed between the mount rubber 24 and an annular seal member 27 secured to the outer peripheral surface of the shock absorber outer cylinder 25.

The manner of operation of the suspension system will be discussed hereinafter.

Fore-and-aft forces such as driving and braking forces exerted on the wheel 6 during starting, acceleration, deceleration and braking of the vehicle and lateral forces exerted on the wheel 6 during vehicle turning are supported by a so-called suspension link structure consisting of the upper control arm 12, the lower control arm 14 and the extension bracket 18. This suspension link structure is high in rigidity because the upper control arm 12 is positioned high and there is a large distance between the upper and lower control arms 12, 14. The rigidity of the suspension link structure is further improved because the outboard end sections 12b, 14b of the upper and lower control arms 12, 14 are connected by the extension bracket 18.

Vertical force exerted on the wheel 6 is carried by the coil spring 28 because the above-mentioned suspension link structure is vertically swingable, while relative vibration between the side of the wheel 6 and the side of the vehicle body 11 is damped by the shock absorber 22, in which there is a very small relative movement between the extension bracket 18 and the shock absorber 22.

When a knuckle arm section (not shown) of the knuckle 10 is operated by a steering system (not shown) of the vehicle, the wheel 6 is turned around the steering system (not shown) of the vehicle, the wheel 6 is turned around the steering axis passing through the knuckle 10, the axle shaft 3, and the wheel 6. At this time, moments acting around the ball joints 19, 21 other than ones around the steering axis K are reacted by the extension bracket 18, and therefore only moments around the steering axis K act on the ball joints 19, 21. Accordingly, a light load is exerted on a so-called kingpin structure consisting of the ball joints 19, 21, thereby rendering the kingpin structure small-sized, light in weight, and simple in construction.

Furthermore, since the steering axis is set regardless of the joint J between the upper control arm 12 and the extension bracket 18, the location and inclination of the steering axis K is suitably selectable, so that the scrub radius can be suitably selected to be positive, zero or negative, while the length of the upper control arm 12 can be set regardless of the location and inclination of the steering axis K. Additionally, the length of the upper control arm 12 is set to be sufficient to obtain suitable wheel alignment, i.e., so that its length is similar to that of the lower control arm 14. With such a length, the upper control arm 12 can be disposed outward relative to the vehicle body 11 or projected to the side of the wheel 6.

Thus, the above-discussed double link type suspension system offers the following advantageous effects. Since the upper control arm is located at a higher position, there is a large distance between the upper and lower control arms. Consequently, even if assembly accuracy is relatively low and there is considerable assembly error, setting error of camber angle and caster angle is relatively small. Additionally, rigidity (i.e., camber rigidity proportional to the square of the distance between the upper and lower control arms) against the variation of camber angle becomes relatively large, and therefore the marginal performance of camber angle variation becomes high. Furthermore, input force to the vehicle body is minimized as compared with lateral forces or fore-and-aft forces acting on a position of the tire contacting with the ground, so that the suspension link structure can be light in weight and therefore can be inexpensively produced. Moreover, there occurs a very little camber angle variation when the upper and lower control arms swing vertically. The arrangement in which the upper control arm is located at a higher position is particularly effective for the FF or 4WD type vehicle which necessitates a drive shaft for front wheels so that there is no space for the upper control arm inside the wheel.

Since the length of the upper control arm is optionally selectable regardless of the location or inclination of the steering axis, the upper control arm can be prolonged to a length similar that of to the lower control arm. This sharply minimizes the camber angle variation along with vertical movement of the vehicle body, while minimizing the amount of projection of the wheel upper section into the inside of the vehicle body during bouncing thereby minimizing the wheel house and accordingly widening the engine compartment. Furthermore, the amount of movement of the crossing position of the suspension link structure and the steering axis K is minimized particularly in the outer side wheel 6 during vehicle turning, thereby suppressing the development of down-force or jackdown due to lateral force.

The fact that the upper control arm is positioned high and disposed outward relative to the vehicle body and has a sufficient length which is optionally selectable regardless of the steering axis leads to minimizing the width of the wheel house thereby enlarging the width of the engine compartment. Furthermore, since the relative movement between the extension bracket and the shock absorber is very small during wheel turning for steering, it is possible to dispose them close to each other, thereby narrowing the wheel house and widening the engine compartment. Moreover, since the suspension link structure makes only vertical swinging movement, the joint J between the upper control arm and the extension bracket is sufficient to be constructed of the mere rubber insulation bushing and it is unnecessary to use a ball joint. This minimizes the height of the joint by about 40 mm as compared with the case in which a ball joint is used. In this connection, a rubber insulation bushing is usually smaller by about 40 mm in height dimension than a ball joint in the suspension link structure of a double wish-bone type suspension system. Fore-and-aft forces exerted on the wheel upon starting, acceleration, deceleration and braking of the vehicle act on a point at which the extension of the steering axis intersects the upper control arm. This minimizes force input to the upper control arm at a section attached to the vehicle body, thereby enabling the weight of the vehicle body to be lightened and reducing the load on the rubber insulation bushing. Accordingly, the rubber insulation bushing is enabled to be small-sized and softened thereby improving its sound attenuating ability. In addition, since the outboard end sections of the upper and lower control arms are connected by the extension bracket, load applied to a kingpin axis structure having the steering axis K is minimized thereby making it possible to render the kingpin structure small-sized, and light in weight and also making it possible to simplify the kingpin structure.

Figure 2:
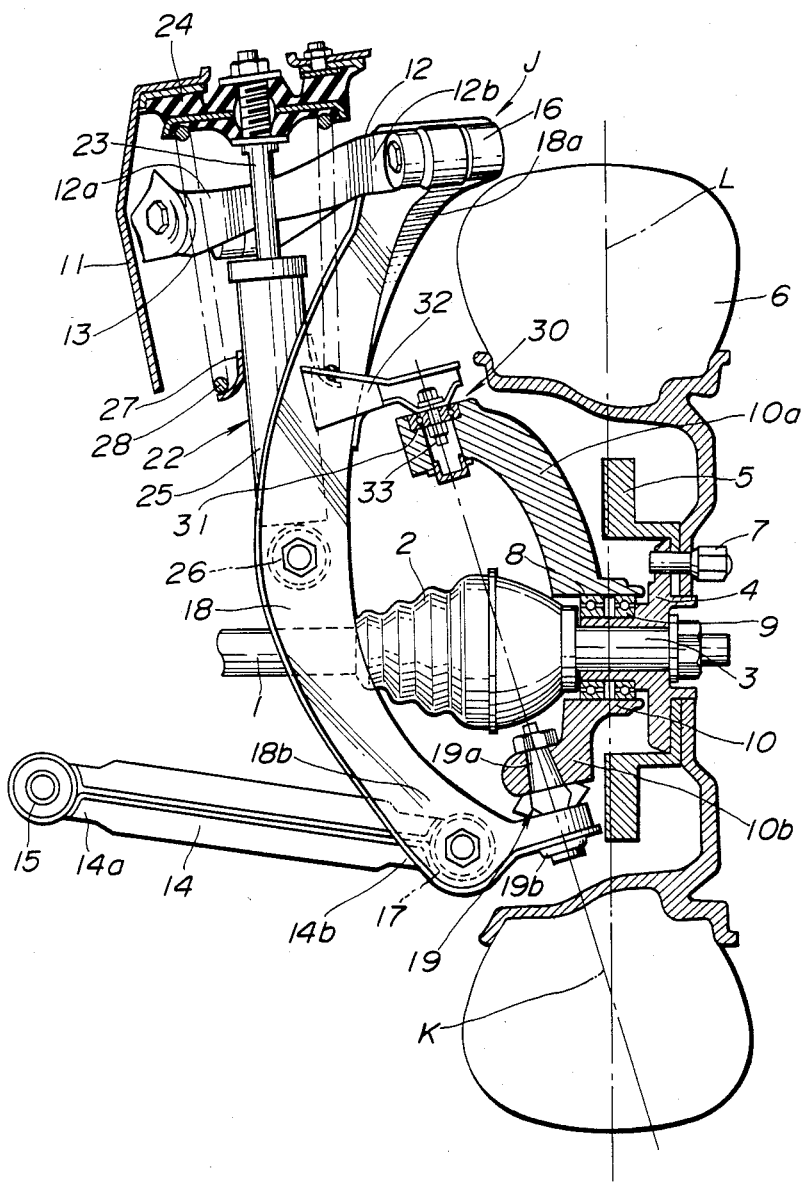
FIG. 2 is a front elevation similar to FIG. 1 but showing a second embodiment of the double link type suspension system in accordance with the present invention.

FIG. 2 illustrates a second embodiment of the suspension system in accordance with the present invention, which is similar to the first embodiment with the exception that a joint 30 is used in place of the ball joint 21. In this embodiment, a support bracket 32 is fixedly secured to the extension bracket 18 and extends outwardly relative to the vehicle body 11. The support bracket 32 is fixedly provided with a small shaft 33 on which an annular ball bearing 31 is mounted. The ball bearing 31 is securely supported by the tip end portion of the knuckle upper section 10a in such a manner that the knuckle upper section tip end portion is rotatable around the axis of the small shaft 33. As shown, the axis of the small shaft 33 is aligned with the axis of the ball stud 19a of the ball joint 19 thereby forming the steering axis or kingpin axis K. The support bracket 32 may be integral with the extension bracket 18. In this embodiment, only moment around the steering axis K acts on the kingpin axis structure including the steering axis K, and therefore no other moment acts thereon.

It will be understood that the second embodiment suspension system operates similarly to the first embodiment and offers the same advantageous effects as the first embodiment one.

Figure 3:
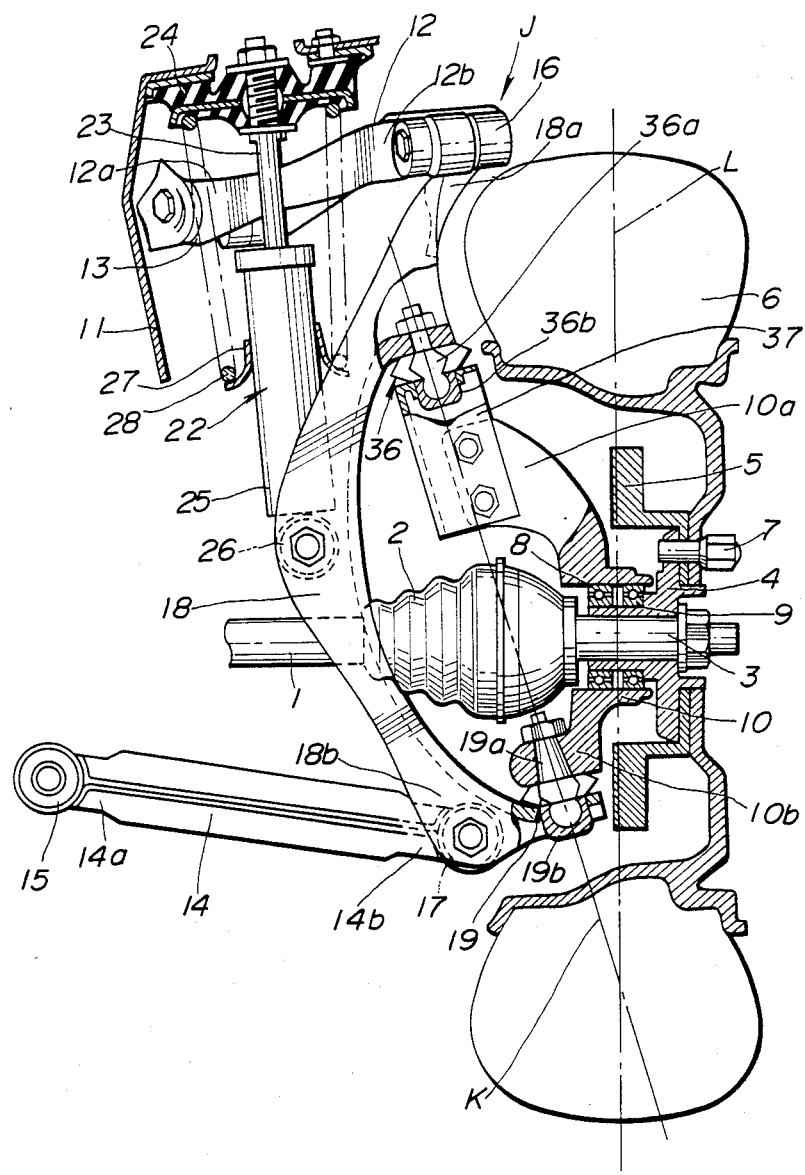
FIG. 3 is a front elevation similar to FIG. 1 but showing a third embodiment of the double link type suspension system in accordance with the present invention.

FIG. 3 illustrates a third embodiment of the suspension system according to the present invention, which is similar to the first embodiment except for the structure of the joint connecting the knuckle upper section 10a and the extension bracket 18. In this embodiment, the joint connecting the knuckle upper section 10a and the extension bracket 18 includes a ball joint 36 whose ball stud 36a is directly fixed to a part of the extension bracket 18. The ball section of the ball stud 36a is press-fit into a retainer section 36b formed at the top of a knuckle fixing bracket 37 which is bolted to the upper section 10a of the knuckle 10. The axis of the ball stud 36a is aligned with the axis of the ball stud 19a of the ball joint 19 for connecting the extension bracket 18 and the knuckle lower section 10b, thereby forming the steering axis or kingpin axis K. Such an arrangement makes it possible to jointly use a strut-type suspension system and the knuckle 10.

While only the front suspension systems for the vehicles of the FF type or the 4WD type have been shown and described, it will be understood that the principle of the present invention may be applied to other suspension systems such as a front suspension system for a front engine rear wheel drive type vehicle.

What is claimed is:

1. A double link type suspension system for a vehicle, comprising:
    a knuckle for rotatably supporting a wheel of the vehicle, said knuckle having an upper and a lower end;
    a first joint which is connected to the lower end of said knuckle;
    a second joint which is connected to the upper end of said knuckle;
    an upper control arm having an inboard end which is rotatably connected to a vehicle body and an outboard end;
    a lower control arm having an inboard end which is rotatably connected to the vehicle body, and an outboard end which is rotatably connected through said first joint to the lower end of said knuckle;
    an extension member having an upper end which is rotatably connected to the outboard end of said upper control arm, and a lower end which is rotatably connected to the outboard end of said lower control arm, said extension member being rotatably connected through said second joint to the upper end of said knuckle between the upper and lower ends of said extension member, an axis connecting said first and second joints serving as a steering axis around which the wheel is turnable to steer the vehicle.

2. A double link type suspension system as claimed in claim 1, wherein said first and second joints have first and second axes, respectively, around which the wheel is turnable, said first and second axes being aligned with each other to form said steering axis.

3. A double link type suspension system as claimed in claim 2, wherein the outboard end of said lower control arm is indirectly connected to the lower end of said knuckle, said extension member has a projection which is integrally formed thereon and which is rotatably connected through said first joint to the lower end of said knuckle, and the outboard end of said lower control arm is rotatably connected to said extension member at a position at which said projection is formed.

4. A double link type suspension system as claimed in claim 1, further comprising a third joint which rotatably connects the upper end of said extension member and the outboard end of said upper control arm, wherein said extension member is curved such that said third joint is located closer to the wheel than the central section of said extension member.

5. A double link type suspension system as claimed in claim 4, wherein said third joint includes an elastomeric insulation bushing disposed between the upper end of said extension member and the outboard end of said upper control arm.

6. A double link type suspension system as claimed in claim 3, wherein said first joint is a first ball joint whose axis forms part of said steering axis.

7. A double link type suspension system as claimed in claim 6, wherein said first ball joint includes a ball stud secured to the lower end of said knuckle, and a retainer for rotatably supporting said ball stud, said retainer being secured to said projection of said extension member, said ball stud having an axis forming part of said steering axis.

8. A double link type suspension system as claimed in claim 1, further comprising an elastomeric insulation bushing which connects the inboard end of said upper control arm to the vehicle body.

9. A double link type suspension system as claimed in claim 1, further comprising an elastomeric insulation bushing which connects the inboard end of said lower control arm to the vehicle body.

10. A double link type suspension system as claimed in claim 3, wherein said second joint is a second ball joint having an axis forming part of said steering axis.

11. A double link type suspension system as claimed in claim 10, wherein said second ball joint includes a ball stud secured to the upper end of said knuckle, and a retainer for rotatably supporting said ball stud, said retainer being fixedly connected to said extension member.

12. A double link type suspension system as claimed in claim 11, wherein said second joint includes a support bracket for rigidly connecting said extension member and said second ball joint retainer.

13. A double link type suspension system as claimed in claim 10, wherein said second ball joint includes a ball stud directly secured to said extension member, a bracket secured to the upper end of said knuckle, and a retainer which is secured to said bracket.

14. A double link type suspension system as claimed in claim 1, further comprising a shock absorber disposed generally vertically near said extension member.

15. A double link type suspension system as claimed in claim 14, wherein said shock absorber has an upper end which is elastically connected to the vehicle body and a lower end which is elastically connected to said extension member.

16. A double link type suspension system as claimed in claim 4, wherein said upper control arm is disposed such that an extension of said steering axis intersects said upper control arm at a position spaced from said third joint.

17. A double link type suspension system as claimed in claim 1, wherein said vehicle is of a front engine front wheel drive type.

18. A double link type suspension system as claimed in claim 1, wherein the vehicle is of a four wheel drive type.

19. A double link type suspension system as claimed in claim 1, wherein the upper end of said extension member extends above the uppermost portion of said wheel.

20. A double link type suspension system for a vehicle comprising:
    a knuckle for rotatably supporting a wheel of the vehicle;
    an upper control arm having an inboard end section movably connected to a vehicle body and an outboard end section;
    a lower control arm having an inboard end section movably connected to the vehicle body, and an outboard end section movably connected through a first joint to a lower section of said knuckle;
    an extension member having an upper end section movably connected through a third joint to said upper control arm outboard end section, and a lower end section movably connected to said lower control arm outboard end section, said extension member being movably connected through a second joint to an upper section of said knuckle, an axis connecting said first and second joints serving as a steering axis around which the wheel is turnable to steer the vehicle; and means by which said second joint is spaced from said upper control arm and said third joint.

* * * * *